United States Patent
Stablo et al.

(10) Patent No.: US 9,708,011 B2
(45) Date of Patent: Jul. 18, 2017

(54) MOTOR VEHICLE FLOOR HAVING AN UPPER REINFORCING SKIN AND AN ACCESSIBILITY OPENING FOR ACCESSING HOLLOW BODIES

(71) Applicant: Compagnie Plastic Omnium, Lyons (FR)

(72) Inventors: Frederic Stablo, Porcieu Amblagnieu (FR); Hugues Cheron, Meximieux (FR)

(73) Assignee: Compagnie Plastic Omnium, Lyons (FR)

( * ) Notice: Subject to any disclaimer, the term of this patent is extended or adjusted under 35 U.S.C. 154(b) by 0 days.

(21) Appl. No.: 14/916,745

(22) PCT Filed: Sep. 5, 2014

(86) PCT No.: PCT/FR2014/052201
§ 371 (c)(1),
(2) Date: Mar. 4, 2016

(87) PCT Pub. No.: WO2015/033075
PCT Pub. Date: Mar. 12, 2015

(65) Prior Publication Data
US 2016/0214652 A1    Jul. 28, 2016

(30) Foreign Application Priority Data
Sep. 6, 2013  (FR) ..................... 13 58605

(51) Int. Cl.
*B62D 25/20*    (2006.01)
*B62D 27/02*    (2006.01)

(52) U.S. Cl.
CPC ........... *B62D 25/20* (2013.01); *B62D 27/026* (2013.01)

(58) Field of Classification Search
CPC ...................................................... B62D 25/20
(Continued)

(56) References Cited

U.S. PATENT DOCUMENTS 4,898,419 A * 2/1990 Kenmochi ............. B62D 21/10
296/191
5,219,439 A * 6/1993 Moore .................... F16F 1/387
296/204
(Continued)

FOREIGN PATENT DOCUMENTS

DE    10044740 A1    3/2002
EP    2146890 B1    4/2012
(Continued)

OTHER PUBLICATIONS

International Search Report PCT/ISA/210 for International Application No. PCT/FR2014/052201 Dated Jan. 19, 2015.
(Continued)

*Primary Examiner* — Jason S Morrow
(74) *Attorney, Agent, or Firm* — Harness, Dickey & Pierce, P.L.C.

(57) ABSTRACT

Motor vehicle floor including a lower skin and an upper skin, the lower skin and upper skin being fixed together so as to form, in at least a part of the floor, at least one hollow body between the skins. The hollow body has at least one technical element and/or at least one fastener for fastening the technical element or an internal vehicle fitting. The hollow body is provided with at least one opening that is positioned and dimensioned so as to allow the fastener and/or the technical element to pass through the opening.

14 Claims, 2 Drawing Sheets

(58) Field of Classification Search
USPC ........................... 296/193.07, 187.08, 37.14
See application file for complete search history.

(56) References Cited

U.S. PATENT DOCUMENTS

| | | | | |
|---|---|---|---|---|
| 5,501,289 A * | 3/1996 | Nishikawa | ............... | B60K 1/04 180/65.1 |
| 8,186,735 B2 * | 5/2012 | Maceri | ................... | B62D 25/20 280/783 |
| 2007/0176452 A1 * | 8/2007 | Schultz | ................... | B60R 11/06 296/37.14 |
| 2012/0043147 A1 * | 2/2012 | Milner | .................... | B60K 1/04 180/68.5 |
| 2012/0161472 A1 * | 6/2012 | Rawlinson | ............... | B60K 1/04 296/187.08 |
| 2012/0286541 A1 * | 11/2012 | Kashiwagi | .......... | B60L 11/1816 296/193.07 |
| 2015/0048652 A1 * | 2/2015 | Maeda | ................... | B62D 21/15 296/187.08 |
| 2015/0107921 A1 * | 4/2015 | Naruke | ................... | B60K 1/04 180/68.5 |
| 2015/0249240 A1 * | 9/2015 | Hihara | .................... | B60K 1/04 180/68.5 |
| 2015/0344077 A1 * | 12/2015 | Mauduit | ........... | B62D 25/2063 180/65.8 |
| 2016/0176445 A1 * | 6/2016 | Ito | ........................... | B60K 1/04 296/193.07 |

FOREIGN PATENT DOCUMENTS

| | | |
|---|---|---|
| EP | 2508414 A1 | 10/2012 |
| FR | 2955077 A1 | 7/2011 |
| JP | 2002067819 A | 3/2002 |

OTHER PUBLICATIONS

Written Opinion of the International Searching Authority PCT/ISA/237 for International Application No. PCT/FR2014/052201 dated Jan. 19, 2015.
French Search Report and Written Opinion for French Application No. FR 1358605 Dated Jun. 17, 2014.
Frutiger R. et al., "Composite Floorpan", Automotive Engineering, Society of Automotive Engineers, Warrendale, PA, US, vol. 101, No. 2, Feb. 1, 1993, pp. 39-43.

* cited by examiner

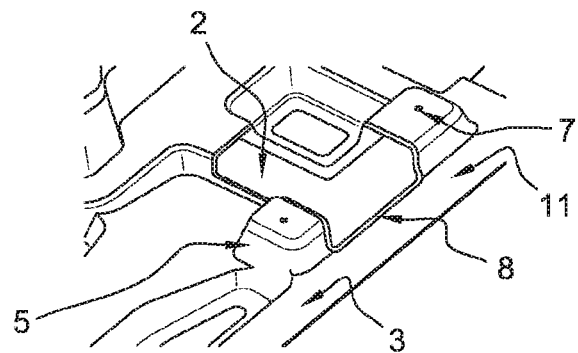
Fig. 2
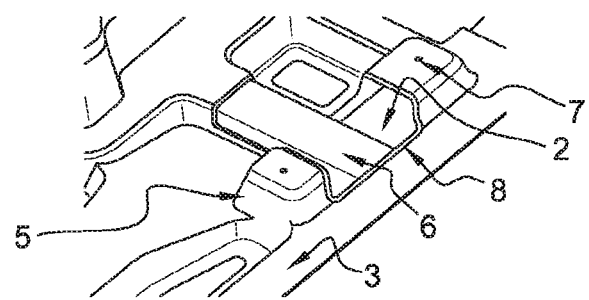
Fig. 3
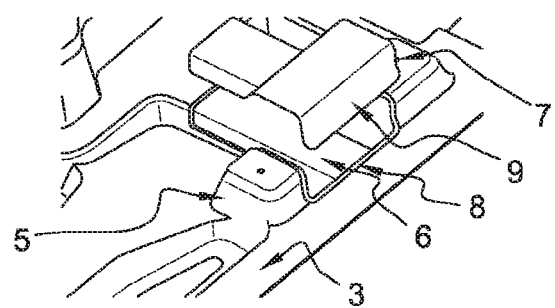
Fig. 4.1
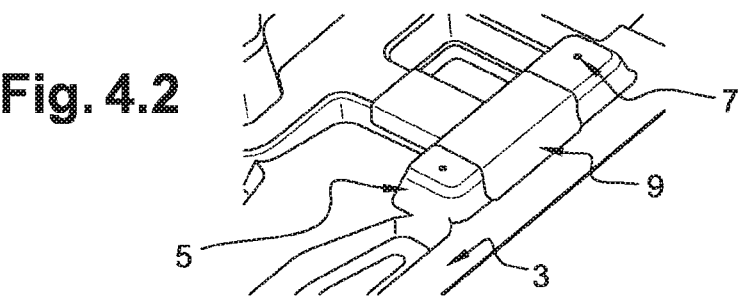
Fig. 4.2

MOTOR VEHICLE FLOOR HAVING AN UPPER REINFORCING SKIN AND AN ACCESSIBILITY OPENING FOR ACCESSING HOLLOW BODIES

CROSS-REFERENCE TO RELATED APPLICATIONS

This application is the U.S. National Phase application of PCT Application No. PCT/FR2014/052201 filed on Sep. 5, 2014, which claims priority to French Application No. 1358605 filed on Sep. 6, 2013, the contents of each of which are incorporated herein by reference in their entirety.

The invention relates to a structural floor for a motor vehicle.

A vehicle floor designed to be attached to a vehicle body in white so as to form a sealed barrier between an inner area of the vehicle and an outer area of the vehicle is already known in the state of the art. A floor designates the part defining the bottom of the passenger compartment.

To be structural, the "floor" part is secured to the vehicle body in white and contributes to its rigidity. It can be made of sheet steel, in which case it is welded to the cross-members of the body in white, or plastic, in which case it is firmly bonded to the cross-members of the body in white.

It is well known to reinforce and stiffen the floor, in particular by integrating ribs or bosses.

To further reinforce the floor, it is known in the state of the art, in particular from EP 2146 890, to provide a floor in two superimposed parts: a lower skin and an upper skin attached to each other.

If the two skins are spaced apart so as to form hollow bodies, a mechanical box effect is created, contributing to the rigidity and structural behaviour of the assembly.

Car manufacturers are always looking for free volumes of the vehicle which can accommodate various functional elements.

Thus, it is known to position inside these hollow bodies equipment such as fuel tanks, batteries, wiring or exhaust lines.

However, it must also be possible for example, when assembling the vehicle or during its period of use, to replace certain components, carry out repairs or maintenance, especially for the batteries, or the equipment fastening means. For example, during the steps of cataphoresis or assembly, the fastening means integrated with one of the floor skins could be damaged.

Frequently, however, to guarantee the strength of the attachment between the two skins and due to constraints of industrial compatibility with the vehicle assembly line, the two skins are bonded together permanently from the start of the vehicle assembly sequence. In this case, it is no longer always possible to access correctly the volume inside the hollow bodies or the elements located on or in these hollow bodies.

There is therefore a need to be able to modify the technical equipment inserted in the hollow bodies. In particular, there is a need to be able to access the means for fastening equipment such as a seat.

The invention therefore relates to a floor consisting of two superimposed skins, attached together, allowing access to the means for fastening equipment (battery, reinforcement means, seat belt, seat, etc.) attached to this floor and/or to the equipment itself. To achieve this, the floor according to the invention comprises at least one hollow body provided with at least one opening positioned and dimensioned so as to allow this fastening means (6) and/or the equipment to pass through the opening (8).

Thus, the invention relates to a motor vehicle floor (1) comprising a lower skin (2) and an upper skin (3), the lower skin (2) and upper skin (3) being fixed together so as to form, in at least a part (4) of the floor, at least one hollow body (5) between said skins. The hollow body comprises at least one technical element (6) and/or at least one means (7) for fastening the technical element (6) or an internal vehicle fitting. In addition, the hollow body (5) is provided with at least one opening (8) that is positioned and dimensioned so as to allow the fastening means (7) and/or the technical element (6) to pass through the opening.

The opening (8) can be carried by the upper skin (3), or by the lower skin (2).

Preferably, the opening (8) is provided with a closing element (9) for mechanically reinforcing the skin (2, 3) carrying the opening (8). This closing element (9) can be attached to the skin (2, 3) carrying the opening (8) by at least one of the following means: gluing, riveting.

According to the invention, the lower skin (2) can be made of composite material, the upper skin (3) can be made of composite material or metallic material, and the closing element (9) can be made of the same material as the skin (2, 3) carrying the opening.

According to one embodiment, the hollow body (5) is located along a lateral edge (11) of the floor (1). According to this embodiment, the floor may comprise a longitudinal element forming a tunnel (10) positioned in the centre of the floor, the tunnel (10) having a second fastening means (7') where the tunnel (10) has no hollow body (5). Alternatively, the hollow body (5) comprises two means (7) for fastening the internal vehicle fitting, and the tunnel (10) comprises two means (7') for fastening the internal vehicle fitting.

According to another embodiment, the floor comprises two hollow bodies (5), each hollow body (5) supporting at least one fastening means (7).

According to the invention, the upper skin (3) may contribute with the lower skin (2) to the structural reinforcement of said floor (1).

Finally, according to the invention, the internal fitting can be a seat or a seat belt buckle, and the technical element (6) can be a structural reinforcement means, padding or a battery pack.

The invention will be better understood on reading the accompanying figures, which are given solely by way of example and not limiting in any way, in which:

FIG. 2 illustrates an opening (8) made in the upper skin (3).

FIG. 3 illustrates the installation of a reinforcement means (6) in the hollow body, through the opening (8).

FIG. 4.1 illustrates an opening (8) and a closing element (9) for mechanically reinforcing the skin (2, 3) carrying the opening (8).

FIG. 4.2 illustrates an opening (8) blocked by a closing element (9).

Figure 5:
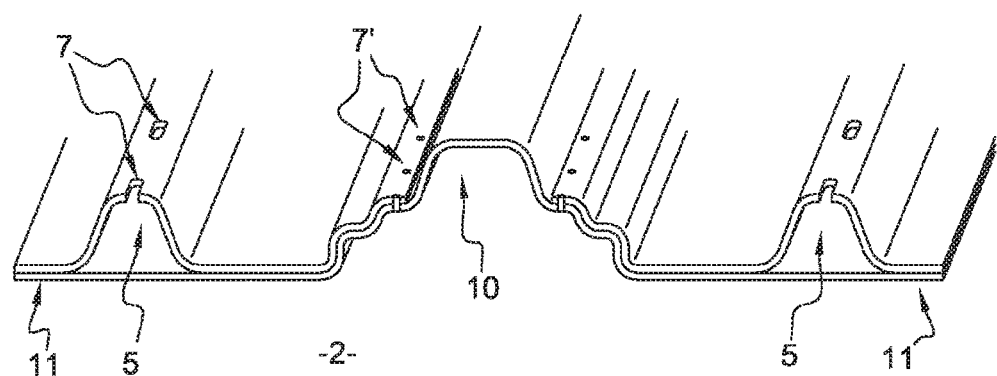

FIG. 5 illustrates an embodiment B, in which the floor (1) comprises a tunnel (10) positioned in the centre of the floor (1), the tunnel (10) having no hollow body (5) at the fastening means (7').

Figure 1:
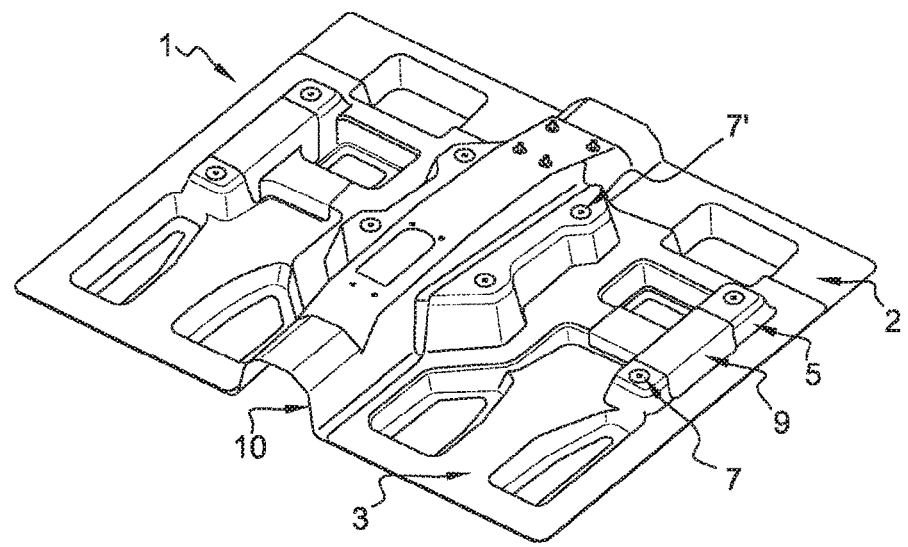
FIG. 1 illustrates a floor according to the invention.

We now refer to FIG. 1. The motor vehicle floor (1) according to the invention comprises a lower skin (2) and an upper skin (3). The latter contributes with the lower skin (2) to the structural reinforcement of the floor (1). The lower skin (2) and upper skin (3) are fixed together so as to form, in at least a part (4) of the floor, at least one hollow body (5) between said skins.

The hollow body (5) comprises (at the skins or in the volume defined by this hollow body) at least one technical element (6) and/or a means (7) for fastening the technical element or an internal vehicle fitting.

An internal vehicle fitting designates a device to be installed in the vehicle passenger compartment, fastened to the floor (1). It may be for example a seat belt buckle or seats.

A technical element (6) designates a functional device to be installed in the floor (1). It may be for example a structural reinforcement means, padding or a battery pack.

The hollow body (5) is provided with at least one opening (8) that is positioned and dimensioned so as to allow the technical element (6) and/or the fastening means (7) to pass through the opening (8). FIG. 2 illustrates such an opening (8) made in the upper skin (3).

When there is a need to access, remove or change a fastening means (7), the opening (8) will preferably be small, in order to preserve the function contributing to the structural reinforcement of the floor (1). Those skilled in the art know how to define the dimension of this opening (8) with respect to the required function.

For example, the means (7) for fastening the technical element (6) or the internal vehicle fitting can be a nut or a nut assembly into which a screw can be inserted to fasten the vehicle internal fitting or the technical element (6). Those skilled in the art can easily determine the size and position of the opening used to access, remove or change this means. If the opening (8) is intended to insert, assemble, fasten, change, repair, or access a technical element, those skilled in the art will adapt the dimension and position of the opening. FIG. 3 illustrates the latter embodiment, in which the opening (8) has been designed to allow replacement of a technical element (6).

The opening (8) can be carried by the upper skin (3), as illustrated on FIG. 2. The inside of the hollow body (5) is then accessed from inside the vehicle. The opening (8) can also be carried by the lower skin (2). The inside of the hollow body (5) is then accessed from the outside, underneath the vehicle.

Obviously, the floor (1) according to the invention may comprise several openings (8), each being carried by one of the two skins (2, 3), and whose shape, position and dimensions are adapted to the fastening means (7) and/or to the technical elements (6) to which it provides access.

The existence of an opening (8) on a part intended to structurally reinforce the floor (1) may weaken this function. It is therefore preferable to provide the opening (8) with a closing element (9) to mechanically reinforce the skin (2, 3) carrying the opening (8), as illustrated on FIGS. 4.1 and 4.2.

This closing element (9), such as a hatch or a door, is attached to the skin (2, 3) carrying the opening (8) by at least one of the following means: gluing, riveting, etc. A continuous attachment is preferable to structurally reinforce the skin (2, 4) at the opening (8).

To avoid making the floor (1) heavier while preserving good mechanical strength, a lower skin (2) made of composite material should preferably be selected. For example, a composite material comprising a mixture of at least reinforcing fibres and a polymer resin of type sheet moulding compound (SMC) can be used. For example, this composite material of type SMC (Sheet Moulding Compound) comprises a mixture of glass fibres and a thermoset polymer resin such as polyester. The mixture also generally comprises mineral fillers in relatively large proportions in particular to limit the consumption of polyester resin.

The upper skin (3) is preferably made of a composite material or a metallic material.

The closing element (9) is preferably made of the same material as the skin (2, 3) carrying the opening.

The number and positions of the fastening means are adapted according to the internal fitting to be attached.

Thus, according to an embodiment A, the hollow body (5) is located along a lateral edge (11) of the floor (2), as illustrated on FIGS. 2 to 4.2. This allows the attachment of a reinforcement means (padding) or a battery pack. It can also be used for one of the attachments of a seat.

According to an embodiment B, the floor (1) comprises a longitudinal element forming a tunnel (10) and positioned in the centre of the floor. This type of tunnel (10) is generally used to position the exhaust pipe for example. According to this embodiment, this tunnel (10) comprises a second fastening means (7'), the first fastening means (7) being positioned at the hollow body (5).

According to this embodiment, the tunnel (10) has no hollow body (5) at the fastening means (7'), in other words the upper skin (3) and lower skin (2) are contiguous here, as illustrated on FIG. 5. Since there is no hollow body, the fastening means (7') can be accessed directly from the lower skin (2), under the vehicle. This type of fastening and accessibility is illustrated on FIG. 5.

Thus, according to this embodiment, an internal fitting can be fastened simultaneously in several places of the floor, the fasteners of this fitting being distributed between the tunnel (10) and the hollow body (5), preferably lateral, as illustrated on FIG. 5.

According to an embodiment C, a variant of embodiment B, the hollow body (5) comprises two means (7) for fastening for example an internal vehicle fitting, and the tunnel (10) comprises two means (7') for fastening this internal fitting. This embodiment is especially suitable for fastening a seat to the floor.

The invention has been described purely by way of example and is not limiting in any way, and it is obvious that numerous modifications may be made to its details without departing from its spirit. For example, the invention also relates to a floor (1) comprising several hollow bodies (5) supporting one or more means (7) for fastening the same technical element or internal fitting (6).

The invention claimed is:

1. Motor vehicle floor comprising:
    a lower skin and an upper skin, the lower skin and upper skin being fixed together so as to form, in at least a part of the floor,
    at least one hollow body between said skins,
    said floor including a longitudinal element forming a tunnel positioned in the center of the floor,
    wherein said hollow body includes at least one technical element and/or at least one means for fastening said technical element or an internal vehicle fitting,
    said hollow body being provided with at least one opening that is positioned and dimensioned so as to allow said fastening means and/or said technical element to pass through the opening, and
    said tunnel having a second fastening means where the tunnel has no hollow body.

2. Floor according to claim 1, wherein said opening is carried by said upper skin.

3. Floor according to claim 1, wherein said opening is carried by said lower skin.

4. Floor according to claim 2, wherein said opening is provided with a closing element for mechanically reinforcing the skin carrying the opening.

5. Floor according to claim 4, wherein said closing element is attached to the skin carrying the opening by at least one of the following means: gluing, riveting.

6. Floor according to claim 1, wherein said lower skin is made of composite material.

7. Floor according to claim 1, wherein said upper skin is made of composite material or metallic material.

8. Floor according to claim 4, wherein said closing element is made of the same material as the skin carrying the opening.

9. Floor according to claim 1, wherein said hollow body is located along a lateral edge of said floor.

10. Floor according to claim 1, wherein the hollow body comprises two means for fastening said internal vehicle fitting, and the tunnel comprises two means for fastening said internal vehicle fitting.

11. Floor according to claim 1, wherein the floor comprises two hollow bodies, each hollow body supporting at least one fastening means.

12. Floor according to claim 1, wherein the upper skin contributes with the lower skin to the structural reinforcement of said floor.

13. Floor according to claim 1, wherein said internal fitting is a seat or a seat belt buckle.

14. Floor according to claim 1, wherein said technical element is a structural reinforcement means, padding or a battery pack.

* * * * *

UNITED STATES PATENT AND TRADEMARK OFFICE
CERTIFICATE OF CORRECTION

Page 1 of 1

PATENT NO. : 9,708,011 B2
APPLICATION NO. : 14/916745
DATED : July 18, 2017
INVENTOR(S) : Frederic Stablo and Hugues Cheron It is certified that error appears in the above-identified patent and that said Letters Patent is hereby corrected as shown below:

On the Title Page

(71) Applicant should read: Compagnie Plastic Omnium, Lyon (FR)

(73) Assignee should read: Compagnie Plastic Omnium, Lyon (FR)

In the Specification

Column 1, Line 29 to Line 32 should read: To further reinforce the floor, it is known in the state of the art, in particular from EP 2 146 890, to provide a floor in two superimposed parts: a lower skin and an upper skin attached to each other. Contiguous superimposition of the two skins forms a local structural reinforcement against tearing for the floor.

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*